United States Patent [19]
LaBlue

[11] Patent Number: 5,321,890
[45] Date of Patent: Jun. 21, 1994

[54] SAWDUST CATCHER FOR A CHAIN SAW

[76] Inventor: Rick LaBlue, 788 N. 70th, Springfield, Oreg. 97478

[21] Appl. No.: 57,119

[22] Filed: May 3, 1993

[51] Int. Cl.$^5$ ............................................. B27B 17/02
[52] U.S. Cl. ........................................ 30/124; 30/381
[58] Field of Search ................ 30/122, 124, 381, 382, 30/383, 384, 385, 386, 387, 516; 83/98, 100; 144/252 R; 51/273; 125/21; 15/257.1

[56] References Cited

U.S. PATENT DOCUMENTS

| | | | |
|---|---|---|---|
| 1,271,639 | 7/1918 | Watters | 144/252 R |
| 2,419,751 | 4/1947 | Wilson et al. | 144/252 R |
| 3,380,493 | 4/1968 | Giroux | 30/382 |
| 4,858,318 | 8/1989 | Anderson | 30/383 X |
| 5,084,972 | 2/1992 | Waugh | 144/252 R |
| 5,088,197 | 2/1992 | Anderson | 30/124 X |

Primary Examiner—Rinaldi I. Rada
Attorney, Agent, or Firm—Douglas A. Burcombe

[57] ABSTRACT

A passive sawdust catcher adaptable to a variety of conventional chain saws consists of a sawdust container and a bracket for connecting the container to the chain saw. The container consists of a fabric bag over a rigid frame, having a top and front opening for receiving or discharging sawdust. The bracket fastens to the bottom of the chain saw body and provides for connection of the container to the chain saw when the bracket is so fastened so that the top and front opening of the container is positioned to receive at least 50% of the discharge stream of sawdust created during a cutting operation.

7 Claims, 4 Drawing Sheets

SAWDUST CATCHER FOR A CHAIN SAW

BACKGROUND OF THE INVENTION

This invention relates to a system for catching sawdust expelled by a chain saw and more particularly to a sawdust catcher for catching and containing the sawdust expelled from a chain saw during operation of the chain saw.

Chain saws historically were developed and used for cutting down trees in the forest. The chain carrying the wood-cutting teeth travels around a guide bar fitted to the body of the saw and in most applications the chain is exposed for the length of the guide bar. During a cutting operation, sawdust is discharged towards and below the bottom of the saw body from the rearward base of the cut and therefore onto the ground where it becomes part of the forest floor. In that application, there was no need to capture and contain the sawdust and neither the applicant nor attorney know of any examples of prior art that demonstrate a means for capturing and containing the sawdust produced by a conventional chain saw during a cutting operation.

Chain saws have now become popular as a yard tool for cutting trees and firewood in the suburban setting where production of a sawdust pile on the ground is not desirable. The applicant's invention solves the sawdust pile problem by providing for a sawdust catcher for a chain saw which passively catches and contains the sawdust produced by a chain saw during a cutting operation.

While other types of conventional wood-working tools with dust collection systems do exist, they are usually stationary tools with some sort of complicated vacuum apparatus for retrieving dust such as hoods enclosing the blades on radial arm saws or vacuum bases on a table saw. Some portable cutting tools with complicated dust collection systems have also been made.

In U.S. Pat. No. 5,084,972 a vacuum operated dust collection system for a portable circular saw can be seen.

U.S. Pat. No. 5,033,192 demonstrates a sawdust blower attachment for a power saw.

U.S. Pat. No. 5,074,044 pertains to a dust disposal attachment for a rotary element of a power tool having an impeller encased in an impeller head channelled to a disc enclosing head.

U.S. Pat. No. 5,088,197 provides for a power saw convertible to a chain saw and having a housing member adapted to divert sawdust, said diversion necessitated by the conversion hardware.

None of the dust collection systems previously cited work as simply as the applicant's invention nor are they adaptable to a conventional chain saw and are only mentioned to further demonstrate the novelty and utility of the chain saw sawdust catcher invention.

SUMMARY OF THE INVENTION

During the wood-cutting operation of a chain saw, a chain loop bearing the wood-cutting teeth revolves axially around a steel guide bar fixed at one end to the chain saw body and extending horizontally therefrom. As the chain travels around the bar, sawdust is discharged towards and just below the base of the saw body at the point where the chain re-enters the saw body and below that portion of the saw body that houses the chain driving sprocket.

The present invention provides for a sawdust catcher comprising a hollow container having an ingress means whereby said container can be attached to a chain saw so that the ingress means is aligned with the discharge stream of sawdust created during a cutting operation. As the chain saw is operated, discharged sawdust enters the ingress means of the sawdust catcher and fills the hollow container integral therewith. The container also has a means for emptying out the stored sawdust once the container is full.

One object of the invention is to provide for the sawdust catcher to be selectively detachable so that the chain saw can also be operated in situations where having the sawdust catcher attached would otherwise impede or prevent certain cuts being made.

A further object of the invention is to provide for a means for connecting the sawdust catcher to a variety of chain saws manufactured by different manufacturers. Said connecting means could include structural changes in the chain saw itself so that the container could connect directly to the chain saw. However, the more practical embodiments of the invention utilize an intermediate device adaptable to most saws which would connect to the chain saw and to the container.

Other objects, features and advantages of the invention will become apparent from a reading of the specification when taken in conjunction with the drawings in which like reference numerals refer to like elements in the several views.

DETAILED DESCRIPTION OF THE PREFERRED EMBODIMENT

Figure 1:
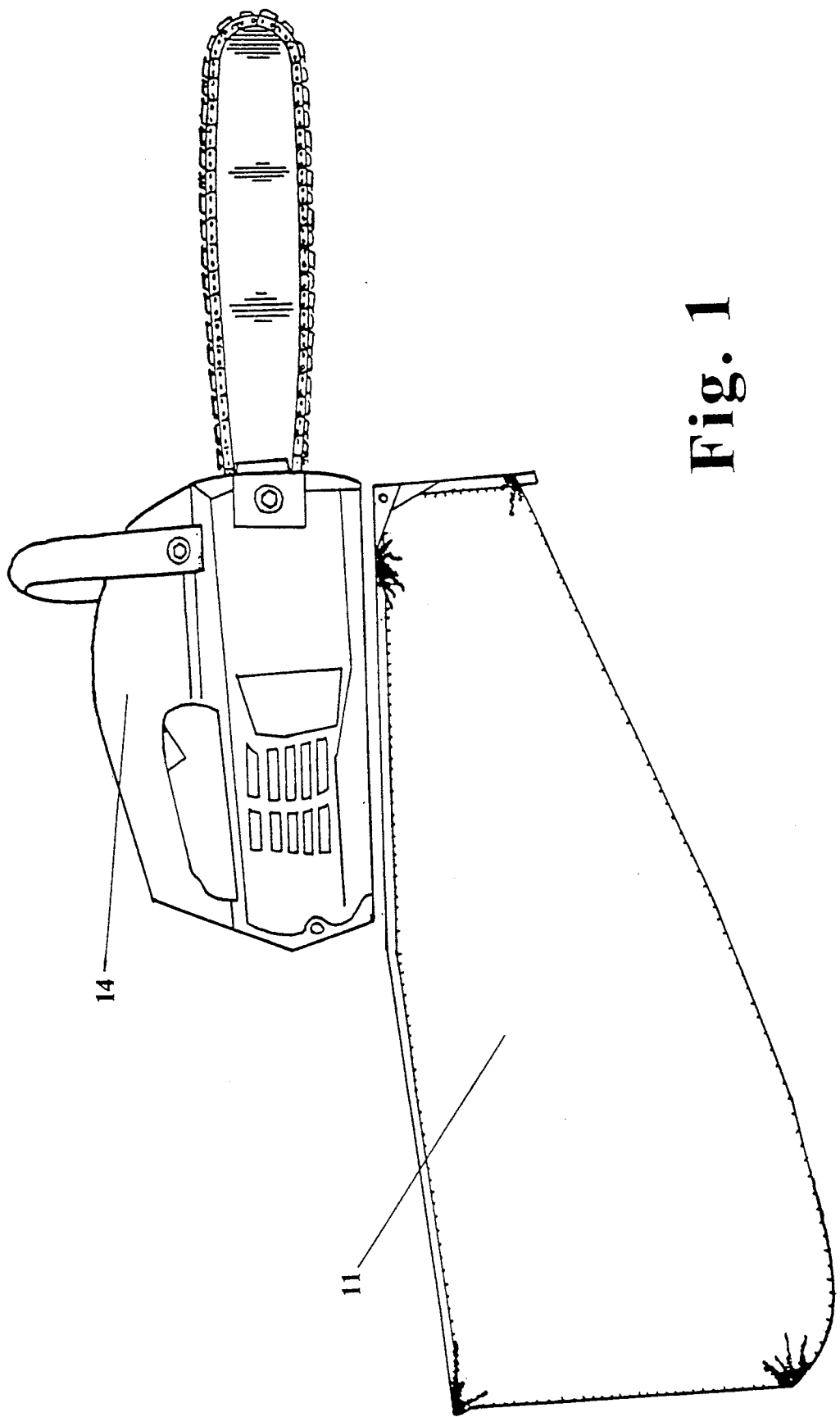
FIG. 1 is a side view of the sawdust catcher connected to a chain saw.

Referring to FIG. 1, the sawdust catcher 11 is shown connected to a chain saw 14.

Figure 2:
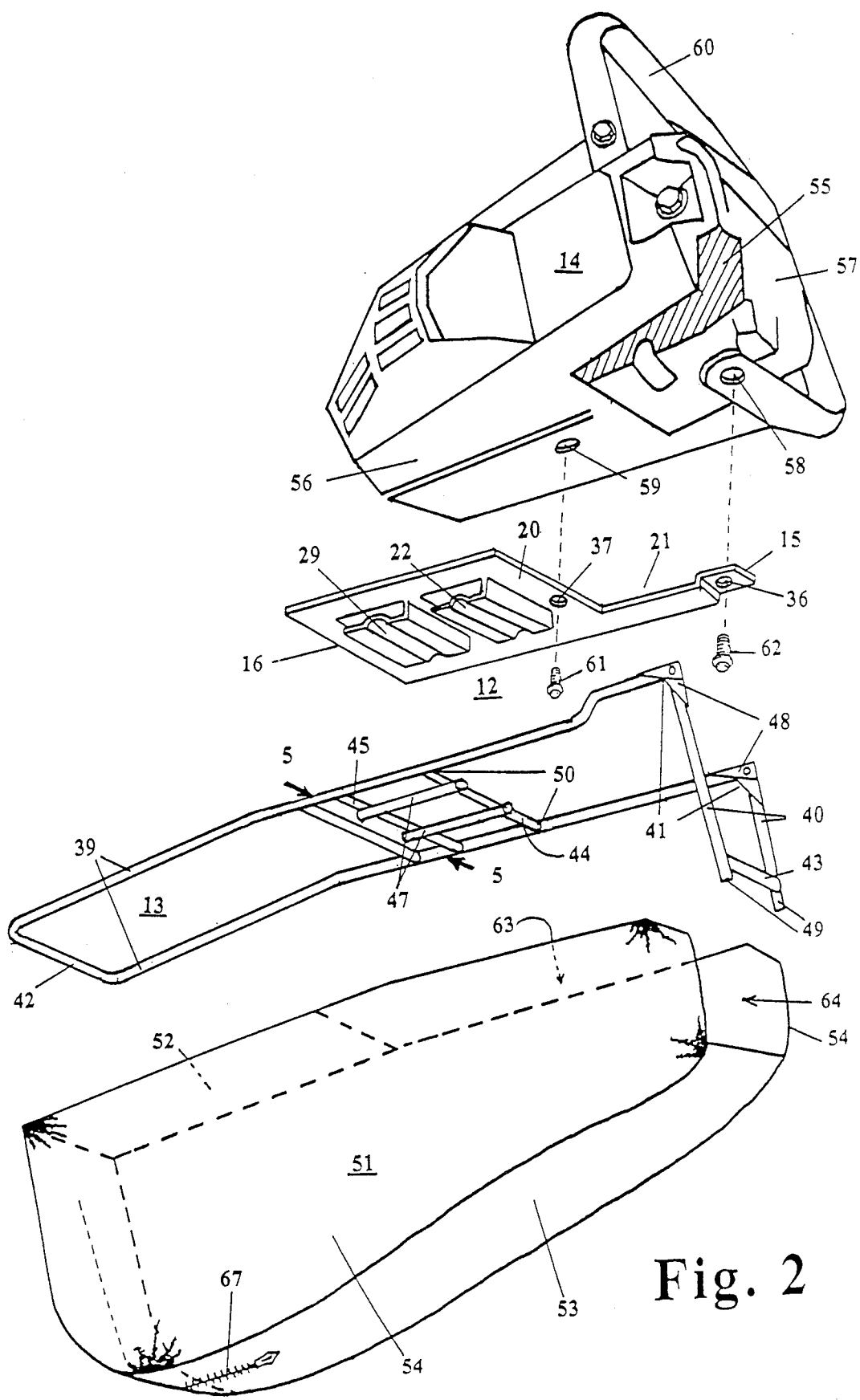
FIG. 2 is an exploded perspective view of the sawdust catcher in positional relationship to a chain saw having the chain saw blade detached.

In FIG. 2, an exploded perspective view illustrates a means for connecting the container 11 to the chain saw 14 whereby said means include a bracket 12 and the container frame 13. FIG. 2 further illustrates the positional relationship between the container 11, bracket 12 and the chain saw 14.

Figure 3A:
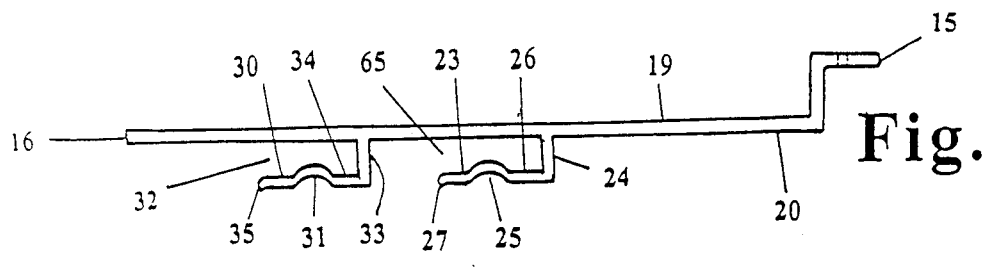
FIGS. 3A and 3B show a side and top view respectively of the bracket.
Figure 3B:
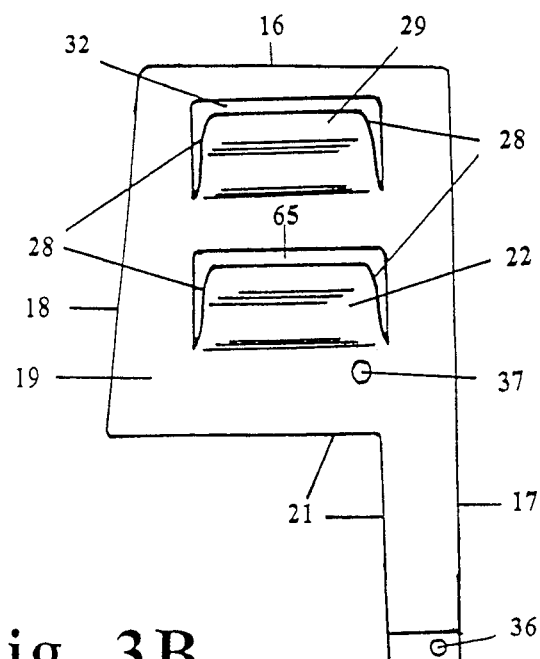

Referring to FIGS. 3A and 3B, the bracket 12 has a front end 15, a rear end 16, a first side 17 and a second side 18, a top surface 19 and a bottom surface 20. A notch 21 in the bracket 12 corresponding in size to the sawdust vent channel opening 55 in the chain saw body bottom 56 (FIG. 2) extends along the side 18 of the bracket 12 from the front end 15 of the bracket rearwards. The notch must provide a sufficient opening in the bracket 12 to allow entry of the sawdust discharge stream past the bracket 12 into the top opening 63 (FIG.

2) of the container 11 when the container is connected to the bracket 12.

A first L-shaped frame-engaging member 22 projects from said bottom surface 20 and forms a slot 65 opening up towards the rear end 16 of the bracket 12. The frame-engaging member 22 comprises a foot extension 24 and a leg extension 23 with the short foot extension 24 projecting from the bottom surface 20 at a right angle to the bottom surface 20 and the leg extension 23 extending towards the rear end 16 of the bracket 12, parallel with the bottom surface 20 and at right angles to the foot extension 24. The foot extension 24 forms the back of the slot 65 and the leg extension 23 is the hooking member of the projection 22 which engages the frame's third crossmember 44 (FIG. 2).

The length of the foot extension 24 is that which separates the leg extension 23 from the bottom surface 20 just enough that the leg extension 23 is slightly biased against the third crossmember 44 when the third crossmember is slid between the leg extension 23 and the bottom surface 20 of the bracket 12. The leg extension 23 has a concave bend 25 projecting toward the bottom surface 20 of the bracket 12 forming a partial crossmember seat 26 between the bend 25 and the foot extension 24 the width of the third crossmember 44. The concave bend 25 is forced away from the bottom surface 20 as the third crossmember 44 is slid past but biases back in behind the inserted third crossmember 44 as the crossmember contacts the foot extension 24 thus forcing the third crossmember 44 against the foot extension 24 in a locked position. The rearward terminal end 27 of leg extension 23 has an outward bend to facilitate the initial insertion of the third crossmember 44 between the bracket's bottom surface 20 and the leg extension 23.

A second L-shaped frame engaging member 29 projects from said bottom surface 20 and forms a second slot 32 which opens up towards the rear end 16 of bracket 12. The second frame engaging member 29 is located between the rear end 16 of the bracket 12 and the first frame engaging member 22 and is positioned so slot openings 32 and 65 are in alignment. The second flame-engaging member 29 comprises a foot extension 33 and a leg extension 30 with the short foot extension 33 projecting from the bottom surface 20 at a right angle to the bottom surface 20 and the leg extension 30 extending towards the rear end 16 of the bracket 12, parallel with the bottom surface 20 and at right angles to the foot extension 33. The foot extension 33 forms the back of the slot and the leg extension 30 is the hooking member of the projection 29 which engages the frame's fourth crossmember 45 (FIG. 2).

The length of the foot extension 33 is that which separates the leg extension 30 from the bottom surface 20 just enough that the leg extension 30 is slightly biased against the fourth crossmember 45 when the fourth crossmember 45 is slid between the leg extension 30 and the bottom surface 20 of the bracket 12. The leg extension 30 has a concave bend 31 projecting toward the bottom surface 20 of the bracket forming a partial crossmember seat 34 between the concave bend 31 and the foot extension 33 the width of the fourth crossmember 45. The concave bend 31 is forced away from the bottom surface 20 as the fourth crossmember 45 is slid past but biases back in behind the inserted fourth crossmember 45 as the crossmember contacts the foot extension 33 thus forcing the fourth crossmember 45 against the foot extension 33 in a locked position. The rearward terminal end 35 of leg extension 30 has an outward bend to facilitate the initial insertion of the fourth crossmember 45.

The slot openings 65 and 32 created by first and second frame-engaging members 22 and 29 have the same dimensions. The length of the frame-engaging members is variable depending on the size of the bracket 12 but should be long enough to engage as much of the corresponding crossmembers 44 and 45 as possible without jeopardizing the bracket's 12 structural integrity. The distance between the frame engaging members 22, 29 is also variable depending on the size of the bracket 12 but should be the maximum distance that still retains the structural integrity of the bracket 12. Both frame-engaging members 22, 29 are further positioned so that both frame engaging members will simultaneously engage the corresponding frame crossmembers 44, 45 when the container 11 is connected to the chain saw 14. The frame-engaging members 22, 29 can be pieces that are welded on or can be formed from the bracket 12 by cutting, bending or forming portions of the bracket 12.

Referring to FIG. 2 and FIG. 3B, the means for connecting the bracket 12 to the chain saw bottom 56 include a bolt hole 36 which can be seen near the front end 15 of the bracket 12 corresponding to and aligned with a bolt hole 58 which fastens the forward handle 60 of the chain saw 14 to the chain saw bottom 56. A second bolt hole 37 can be seen in the bracket 12 between the frame engaging member 22 and the rear end of the notch 21 which corresponds with a casing bolt hole 59 near the center of the chain saw bottom 56. Casing and handle mounting bolts 61, 62 would be removed from the chain saw 14 and those bolts or longer bolts, when necessary, would be used to bolt the bracket 12 to the bottom of the chain saw body so that the top surface 19 of the bracket would be against the bottom 56 of the chain saw with the front end 15 of the bracket including the vent channel notch 21 facing toward the blade end 57 of the chain saw 14.

Minor variations in the structure of the bracket 12 making the bracket adaptable to most chain saws are possible. These variations include: molding, bending, indenting or otherwise shaping the top/bottom surface of the bracket to conform to the bottom of a given chain saw body or to position the bracket bolt holes adjacent and in alignment with corresponding chain saw frame bolt holes; additional bolt holes when necessary; or changes in the size and location of the vent channel notch to correspond to the vent channel in any given chain saw.

Any bracket modifications necessitated by structural irregularities between different chain saws which still allow the bracket 12 to bolt up to the chain saw 14 bottom 56 and perform its function of connecting the container 11 to the chain saw 14 with restricted side-to-side movement and elimination of gaps between the container 11 and the chain saw 14 are contemplated and can be accomplished by one skilled in the art without undue experimentation.

The bracket 12 can be made of any metal or any heat resistant plastic which will maintain the structural integrity required to hold the container 11 in place when bolted to the chain saw 14 but is made of metal in the preferred embodiment.

Connection means could further include structural changes in the chain saw 14 itself so that the container 11 could connect directly to the chain saw.

Figure 3C:
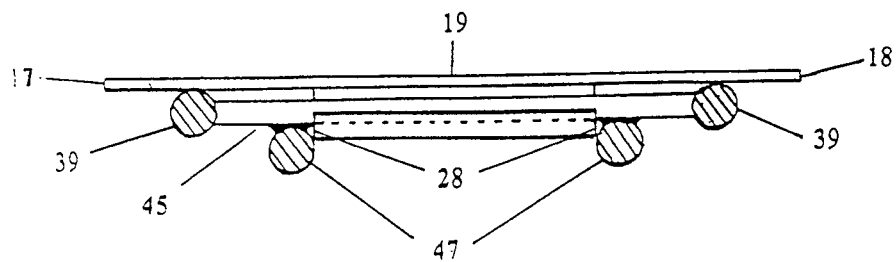
FIG. 3C shows a rear-end view of the bracket with part of the frame engaged. That part of the frame illustrated is a cross sectional view taken on line 5 of the frame as shown in FIG. 2.
Figure 4:
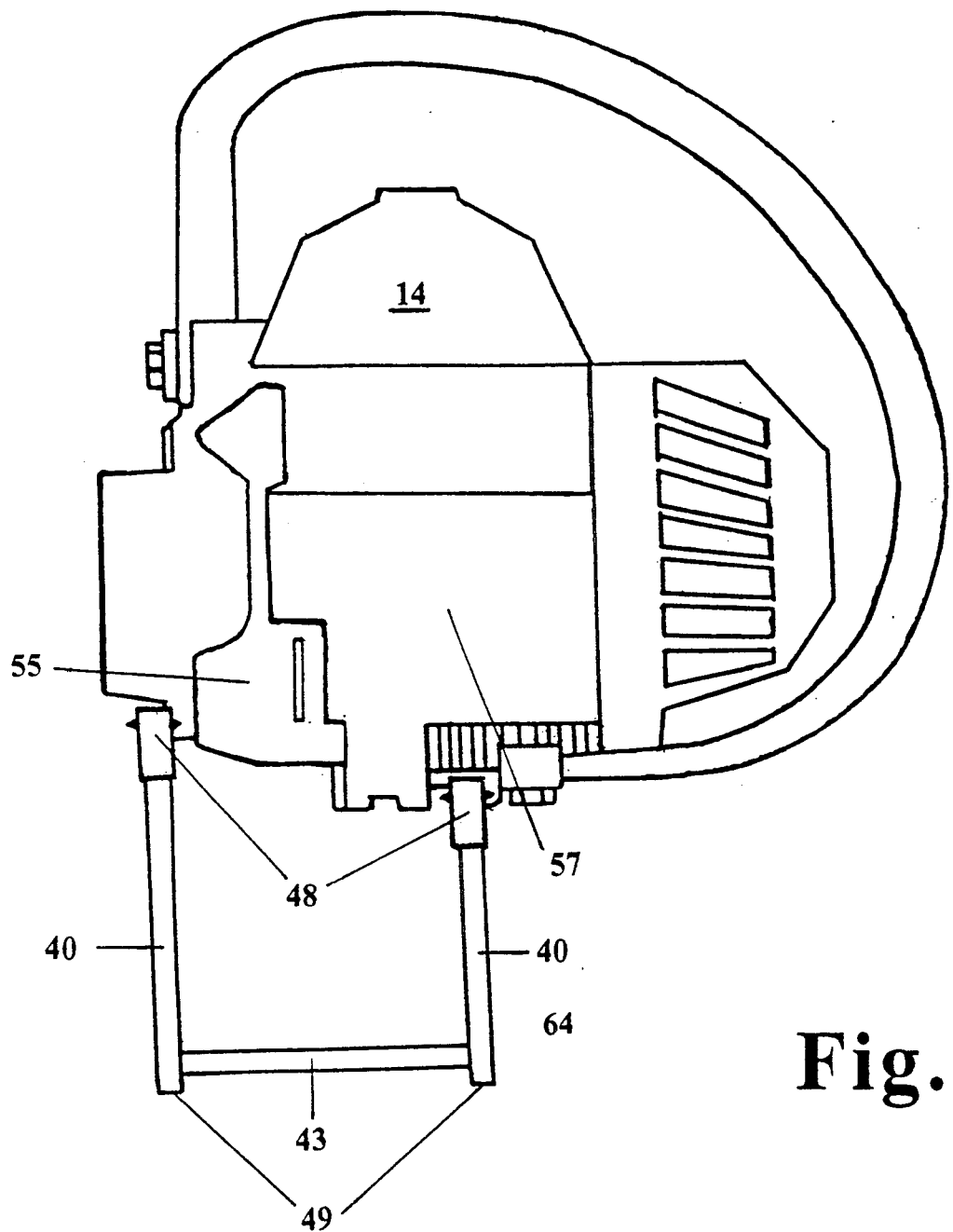
FIG. 4 is a front view of the sawdust catcher frame connected to a chain saw having the chain saw blade detached.

Referring to FIG. 2, the container consists of a fabric bag 51 secured to and supported by a rigid tubular frame 13. The bag 51 when so secured has a top and frontal opening 63, 64 for receiving sawdust. The container connects to the bracket 12 by two frame crossmembers 44, 45 which interlock with the bracket's 12 frame-engaging members 22, 29 respectively. Sideways movement of the container 11 is prevented by contact between frame crossbraces 47 and the sides 28 of the frame engaging members 22, 29 of the bracket 12 (FIG. 3C). When the frame 13 of the container 11 is interlocked with the bracket 12, the bag's top opening 63 and front opening 64 are positioned so as to receive the majority of the sawdust discharge stream (FIG. 2 and FIG. 4).

The frame 13 as seen in FIG. 2 is generally L-shaped and further defines the shape of the top panel 52 and front opening 64 of the container when the fabric bag 51 is attached to the frame 13. The remainder of the bag 51 suspends therefrom.

As illustrated, two L-shaped side members consisting of foot extensions 40 and leg extensions 39 extending from the crotches 41 therebetween are connected together by five crossmembers 42, 43, 44, 45 and 46. The first crossmember 42 connects the ends of the leg extensions 39 opposite the crotch ends 41. The second crossmember 43 connects the foot extensions 40 near the ends opposite the crotch ends 41 so as to leave small ends 49 of each foot extension 40 extending past the second crossmember 43. A third crossmember 44 connects the leg extensions 39 between the crotch ends 41 and the ends opposite the crotch ends so an L-shaped frame is formed having a flat leg face in one plane and a flat foot face in a second plane. The distance between the crotches 41 and the points 50 at which the third crossmember 44 connects to the leg extensions 39 is variable depending in combination upon where frame-engaging member 22 can be located on the bracket 12 and where the foot face having the frontal opening 64 would be located with respect to the blade end 57 of the chain saw 14 when the third crossmember 44 fully engages frame-engaging member 22.

Depending ocrossmemberion of frame-engaging member 22, the third crossmember 44 will attach to the frame 13 at that point 50 where part of the third crossmember 44 will slideably cooperate with and fully engage the first frame engaging member 22 of the bracket 12 and also position the frame 13 so that the foot face of frame 13 will extend vertically downward from but not past the saw body at the blade end 57 of the chain saw 14 as illustrated in FIG. 1. The leg face of the frame 13 would then extend past the rear end of the chain saw 14, parallel to the bottom surface 20 of the bracket 12, in longitudinal alignment with the chain saw 14 and blade thereof.

In one embodiment, the leg 39 and foot 40 extensions of the frame 13 are single continuous pieces formed or bent into the L shape but in the preferred embodiment as illustrated in FIG. 2, spring biased hinges 48 connect the leg 39 and foot 40 extensions of the frame 13 at the crotch 41 between the leg 39 and foot 40 extensions allowing for biased pivotal connection between the foot and leg faces of the frame 13. The spring biased hinges 48 function to bias the foot face of the frame 13 towards the same plane of the leg face as far as the fabric bag 51 permits and further allow the foot face of the frame to pivot backwards allowing more maneuverability of the saw around material being cut.

A fourth crossmember 45 connects the leg extensions 39 together between the first and third crossmembers 42, 44 and is positionally attached so part of said fourth crossmember 45 can slideably cooperate with and fully engage second frame engaging member 29 of said bracket 12 at the same time said third crossmember 44 engages said first frame engaging member 22 of the bracket 12.

A fifth crossmember 46 connects the leg extensions 39 between the first and fourth crossmember 42, 45 as close to the fourth crossmember 45 as possible without interfering with slideable engagement activity.

Two crossbraces 47 connect the third and fourth crossmembers 44, 45 together. The braces 47 each have one end attached to the third crossmember 44 and the other end attached to the fourth crossmember 45, FIG. 2. The crossbraces 47 so connected, are in parallel alignment with the leg extensions 39. The crossbraces 47 are positionally attached to the third and fourth crossmembers 44, 45 so that the crossbraces 47 flank each side of those portions of the third and fourth crossmembers 44, 45 that engage the first and second respective frame-engaging members 22, 29 of the bracket 12 when said rigid frame 13 is connected to the bracket 12 (FIG. 3C). The crossbraces 47 so attached would still permit the frame-engaging members 22, 29 of the bracket 12 to slide over the respective crossmembers 44, 45 thus positioning the sides 28 of the frame-engaging members 22, 29 in very close relation to the crossbraces 47. The crossbraces 47 so attached would further prevent side-to-side movement of the frame 13 when the frame is engaged with the bracket 12 and further position the container openings 63 and 64.

The leg extensions 39, FIG. 2, extending forward from the third crossmember 44 can be bent to define a top opening 63 which contours to the body of various chain saws and insures maximum capture of sawdust around the vent channel 55 and chain saw body and, in combination with the foot extensions 40, further define the size and shape of the front container opening 64 to maximize sawdust capture. The leg extensions 39 extending rearward from the fifth crossmember 46 can be bent to further define the shape and size of the bag extending behind the chain saw.

Referring again to FIG. 2, fabric panels 52, 53 and 54 comprise the bag portion 51 of the container. A top panel 52 is secured to the frame 13 along the first crossmember 42, the leg extensions 39 between the first and fifth crossmembers 42 and 46 and the fifth crossmember 46. A bottom panel 53 having two ends and two sides is secured at one end to the frame 13 along the second crossmember 43 and at the other end to the frame 13 along the first crossmember 42. Two side panels have edges secured to the free edges of the bottom panel 53 and to the frame 13 along the entire length of the leg and foot extensions 39, 40 except where the framer's foot extensions 49 extend past the second crossmember 43, and to those portions of the leg and foot extensions that attached to the spring biased hinges 48. The fabric so connected provides a top wall having an opening 63 the width of the frame between the leg extensions 39 extending from the fifth crossmember 46 forward to the crotch 41 of the frame and a front opening 64 the width of the frame between the foot extensions 40 extending from the second crossmember 43 to the crotch 41 of the frame 13.

The fabric edges can be secured to the frame 13 by rolling the edge of the fabric around the frame rod until it meets the fabric wall and then sewing or gluing the fabric edge to the fabric wall to form a permanent finished loop around the frame rod or by applying mechanical snap fasteners or velcro to the fabric edges and walls so the fabric portion of the container can be selectively removed from the rod frame 13. The fabric can consist of any woven synthetic or natural fiber, or any clothlike material of natural or synthetic derivation which is breathable and pliable enough to be collapsible when the chain saw 14 with the container 11 attached is set on the ground or when the foot face is pivoted rearward yet durable enough to resist the normal wear and tear associated with wood cutting operations involving chain saws. Examples of fabric could be but are not limited to burlap or cotton or nylon weave.

The side panels 54, top panel 52 and bottom panel 53, when so secured form a bag-like container 51 having a partially open top, an open front, a back, a bottom and two sides. The size and shape of the bag depends on the length and width of the bottom panel 53, the dimensions given the side panels 54 which allows the connection of the side panels' free edges to the free edges of the bottom panel and the size and shape of the top and front faces of the frame 13 from which the bag 51 suspends.

In the preferred embodiment the cut of the material defines a bag 51 which, when all the edges of material are secured as previously described, has a bottom inclining downward from the front of the bag 51 at the second crossmember 43 towards the rear of the bag at that angle that best facilitates gravitational drift of sawdust away from top and front wall opening 63 and 64 toward the rear of the bag (FIG. 1). The container 11, when full, would not be so wide as to interfere with the stance of the operator holding the chain saw nor so heavy with sawdust that the chain saw and container together would be too heavy to be practical to the operator.

To provide for additional discharge of sawdust from the container without disconnecting the container from the bracket, a zipper 67 can be sewn in the back or side walls. Other embodiments include using velcro instead of the zipper or sewing an elastic band into the three top panel edges not secured to the fifth crossmember 46 so the top panel 52 can be stretched over the frame 13 along the leg extensions 39 rearward of the fifth crossmember and the first crossmember 42.

A final embodiment comprises a formed plastic container in place of the fabric and frame container. The plastic container could utilize the same or similar bracket connection means. The design of the plastic container would be based on the same criteria dictating the structure of the fabric and frame container.

METHOD OF USE

After bolting the bracket 12 to the bottom 56 of the chain saw 14 as previously described, the saw can be placed down laying on its side or supported by hand. Referring to FIG. 2, the container's top opening 63 would be moved towards the bottom surface 20 of the bracket 12 so as to bring the third and fourth crossmembers 44, 45 of the frame 13 to a position against the bracket 12 bottom surface 20 just in front of the respective frame-engaging members 22, 29 of the bracket 12 with the crossbraces 47 of frame 13 lined up with the sides 28 of the frame engaging members 22 and 29. When so positioned, the container 11 can be slid towards the blade end 57 of the chain saw 14 while maintaining contact between the third and fourth crossmembers 44, 45 and the bottom surface 20 of the bracket 12 so that the crossmembers 44, 45 slide into the slots 65 and 32 between the bracket's bottom surface 20 and the leg extensions 23, 30 of the frame engaging members 22, 29 up to the point where the crossmembers 44, 45 but up to the concave bends 25, 31 on each leg extension 23, 30 of the frame-engaging members 22 and 29.

The crossmembers 44, 45 can be forced past the bends 25, 31 by hitting the frame 13 forward with the heel of the hand against the first crossmember 42. By hitting the frame 13 forward the concave bends 25, 31 will push up and over the crossmembers 44, 45 and snap back to a resting state on the rear sides of the crossmembers 44, 45 preventing rearward motion of the crossmembers 44, 45 with the forward motion of the crossmembers 44, 45 being restricted by the foot extensions 24, 33 of the frame-engaging members 22 and 29. The crossbraces 47 will abut the sides 28 of the frame-engaging members 22, 29 preventing any side-to-side movement (FIG. 3C). The container 11 thus connected will be biased forward towards the blade end 57 of the chain saw 14 in a locked position having restricted side-to-side movement with the top and front openings 63 and 64 lined up with the sawdust discharge stream when the chain saw is operated (see FIG. 2 and FIG. 4).

During operation the chain saw 14 is operated in the typical fashion with sawdust being carried along the chain's teeth back towards the container openings 63 and 64. Some of the sawdust will be carried back into the vent channel 55 (FIG. 2), and diverted down into the top opening 63 by means of the vent channel 55 and some sawdust will be propelled into the front opening 64 as part of a sawdust/air stream. Sawdust will drift to the rear of the bag 51 along the inclined bottom filling the bag 51 from the bottom up. When the sawdust container 11 is full the container can be emptied through the zipper 67 while the container is still connected to the chain saw or the container can be removed from the chain saw by grasping the container by the first crossmember 42 and jerking backwards to disengage the crossmembers from the frame-engaging members. Sawdust can then be dumped out through the top and front openings 63, 64 or through the zipper 67. The chain saw can also be placed on the ground using the container frame 13 as a stand whereby the bag 51 will collapse and the frame 13 will rest on the two feet 49 formed at the end of the foot extensions 40 and on the first crossmember 42, FIG. 2.

Since the principles of the invention have now been made clear, modifications which are particularly adapted for specific situations without parting from those principles will be apparent to those skilled in the art. The appended claims are intended to cover such modifications as well as the subject matter described and to be limited only by the true spirit of the invention.

I claim:

1. The combination of a chain saw and sawdust catcher, said chain saw having a body, operating and carrying handles connected to said body, an elongated saw chain guide bar connected at one end to said body, a saw chain carried by the guide bar, a sawdust vent channel forming a housing in said body enclosing said end of guide bar, said vent channel comprising a front opening to accept the guide bar and saw chain thereon and a bottom opening below said end of guide bar for the purpose of venting sawdust away from said saw body during operation of said chainsaw, said sawdust catcher comprising a container having means for ingress of sawdust and means for connecting and disconnecting said container to the chain saw so that when container is so connected, said ingress means will be vertically aligned with said vent channel whereby sawdust discharged during operation of the chain saw will be propelled through said ingress means so as to fill said container and when container is disconnected, sawdust can be discharged through said ingress means.

2. A sawdust catcher for a portable hand held chain saw of the type having a body, operating and carrying handles connected to said body, an elongated saw chain guide bar connected at one end to said body, a saw chain carried by the guide bar, a sawdust vent channel forming a housing in said body enclosing said end of guide bar, said vent channel comprising a front opening to accept the guide bar and saw chain thereon and a bottom opening below said end of guide bar for the purpose of venting sawdust away from said saw body during operation of said chainsaw, said sawdust catcher comprising a container having means for ingress of sawdust and means for connecting and disconnecting said container to the chain saw so that when container is so connected, movement of the container is thereby restricted and said ingress means is vertically aligned with said vent channel whereby sawdust discharged during operation of the chain saw will be propelled through said ingress means so as to fill said container and when container is disconnected, sawdust can be discharged through said ingress means, said container further comprising:

a bag, wherein said bag is comprised of fabric;
a rigid frame; and
a means for securing said bag to said rigid frame so said ingress means is provided and said bag can suspend from said rigid frame when said container is connected to the chain saw, said ingress means further comprising a top opening in said container, said top opening being adjacent to said vent channel bottom opening when said container is connected to the chain saw and a front opening in said container, said front opening being vertically aligned with said front opening of said vent channel when said container is connected to the chain saw.

3. A sawdust catcher according to claim 2 wherein said container connecting and disconnecting means comprises;

a rigid bracket, said bracket having holes disposed therein to correspond to and align with shrouding, handle or accessory mounting bolt holes in said chain saw;
means for fastening said bracket to the chain saw; and
means on said bracket for engaging said rigid frame of said container so the container can be connected or disconnected to said bracket while the bracket is bolted to the chain saw.

4. A sawdust catcher according to claim 3 wherein said rigid bracket comprises:

a front end, a rear end, two sides, a top surface and a bottom surface, said top surface being in contact with the chain saw bottom when said bracket is bolted to the chain saw, said front end of bracket then being disposed towards the front opening of the vent channel in said chain saw body;
a notch extending along one of said sides from the front end of said bracket towards the rear end, said notch thus being in alignment with the sawdust vent channel in the bottom of said chain saw and corresponding in size to said channel so as to allow entry of the sawdust discharge stream from the vent channel past the bracket notch into said top wall opening;
a first L-shaped frame engaging member projecting from said bottom surface forming a slot opening up towards the rear end of said bracket, said L-shaped member comprising a foot extension and a leg extension, said foot extension projecting from said bottom surface at a right angle to said bottom surface, said leg extension extending towards said rear end, parallel with said bottom surface and at right angles to said foot extension, said first frame engaging member including means for slideable engagement and holding of the frame between said leg extension and the bottom surface of said bracket; and
a second L-shaped frame engaging member projecting from said bottom surface forming a slot opening up towards the rear end of said bracket, said second member being disposed between the rear end of said bracket and said first frame engaging member and in alignment with said first member, said L-shaped member comprising a foot extension and a leg extension, said foot extension projecting from said bottom surface at a right angle to said bottom surface, said leg extension extending towards said rear end, parallel with said bottom surface and at right angles to said foot extension, said second frame engaging member further including means for slideable engagement and holding of the frame between said leg extension and the bottom surface of said bracket.

5. A sawdust catcher according to claim 4 in which said rigid frame comprises frame members which in combination define said front opening and top opening of said container when said fabric bag is attached to said frame, said frame members comprising:

two L-shaped side members, each having a foot and leg extension and a crotch at the junction of the foot and leg extensions;
at least five crossmembers connecting said side members together including:
(i) a first crossmember connecting the end of the leg extensions opposite the crotch;
(ii) a second crossmember connecting the foot extensions near the ends opposite the crotch so as to leave a small end of each foot extension extending past the crossmember;
(iii) a third crossmember connecting the leg extensions between the crotch ends and the ends opposite the crotch whereby an L-shaped frame is formed having a leg face in one plane and a foot face in a second plane, and part of the third crossmember can slide into the slot formed by the first frame engaging member of the bracket as the frame is connected to the bracket and come to rest against the foot extension of the first frame engaging member thus fixing the position of the frame so that said foot end of frame forms a vertical face extending downward from but not extending past the chain saw body and said leg face of frame extends past the rear end of the chain saw, parallel to the bottom surface of said bracket, in longitudinal alignment with the chain saw and blade thereof;
(iv) a fourth crossmember connecting the leg extensions between the first and third crossmembers whereby as the frame is connected to the bracket, part of said fourth crossmember will slide into the slot formed by said second frame engaging member and come to rest against the foot extension of the second frame engaging member at the same time said third crossmember comes to rest against the foot extension of the first frame engaging member;

(v) a fifth crossmember connecting the leg extensions between the fourth and first crossmember; and at least two crossbraces connecting the third and fourth crossmembers together and attached to the third and fourth crossmembers on each side of that part of the third and fourth crossmembers that slides into the slots formed by said first and second frame engaging members of the bracket when said frame is connected to said bracket, whereby said cross braces abutt against said first and said second frame engaging members when said third and fourth crossmembers engage said first and second frame engaging members, said crossbraces thereby preventing side-to-side movement of the frame and further positioning said container openings.

6. A sawdust catcher according to claim 5 comprising:

said rigid frame having pivotal connection means at the crotch of the leg and foot extensions of said side members so said foot face of said frame can pivot towards the back of said chain saw; and spring means to bias said pivotally connected foot face of frame towards said blade end of chain saw body until forward movement is limited by said fabric bag, said spring means being compressed when said foot face is pushed towards the back of the chain saw.

7. A sawdust catcher according to claim 6 comprising a means for discharging sawdust from the bag while the container is attached to said chain saw.

* * * * *